United States Patent
Schlüter et al.

(10) Patent No.: US 8,980,208 B2
(45) Date of Patent: Mar. 17, 2015

(54) EXHAUST GAS AFTERTREATMENT SYSTEM AND METHOD FOR EXHAUST GAS AFTERTREATMENT

(71) Applicants: Stephan Schlüter, Augsburg (DE); Plamen Toshev, Augsburg (DE)

(72) Inventors: Stephan Schlüter, Augsburg (DE); Plamen Toshev, Augsburg (DE)

(73) Assignee: MAN Diesel & Turbo SE, Augsburg (DE)

( * ) Notice: Subject to any disclaimer, the term of this patent is extended or adjusted under 35 U.S.C. 154(b) by 0 days.

(21) Appl. No.: 14/051,014

(22) Filed: Oct. 10, 2013

(65) Prior Publication Data

US 2014/0105798 A1    Apr. 17, 2014

(30) Foreign Application Priority Data

Oct. 11, 2012   (DE) .......................... 10 2012 019 948

(51) Int. Cl.
*B01D 53/94* (2006.01)
*F01N 3/10* (2006.01)

(52) U.S. Cl.
CPC . *B01D 53/94* (2013.01); *Y02T 10/24* (2013.01)
USPC ............. 423/213.2; 60/274; 60/295; 60/299; 60/301

(58) Field of Classification Search
USPC .................. 423/213.2; 60/274, 295, 299, 301
See application file for complete search history.

(56) References Cited

U.S. PATENT DOCUMENTS

| 8,636,970 B2 * | 1/2014 | Osumi ....................... 423/213.2 |
| 2012/0315204 A1 * | 12/2012 | Osumi ....................... 423/213.7 |
| 2013/0239549 A1 * | 9/2013 | Henry et al. .................... 60/274 |

FOREIGN PATENT DOCUMENTS

| DE | 103 42 003 A1 | 3/2005 |
| DE | 10 2008 043 021 A1 | 5/2009 |

* cited by examiner

*Primary Examiner* — Timothy Vanoy
(74) *Attorney, Agent, or Firm* — Cozen O'Connor

(57) ABSTRACT

An exhaust gas aftertreatment system for an internal combustion engine, particularly for a ship's diesel engine operated with heavy oil, has a SCR catalyst that uses ammonia as reductant. A nozzle is positioned upstream of the SCR catalyst viewed in flow direction of the exhaust gas. Using the nozzle, an aqueous urea solution is decomposed at a defined pressure and at a defined temperature to form water vapor, carbon dioxide and ammonia vapor such that ammonia evaporated by the nozzle is injected into the exhaust gas via the nozzle.

10 Claims, 1 Drawing Sheet

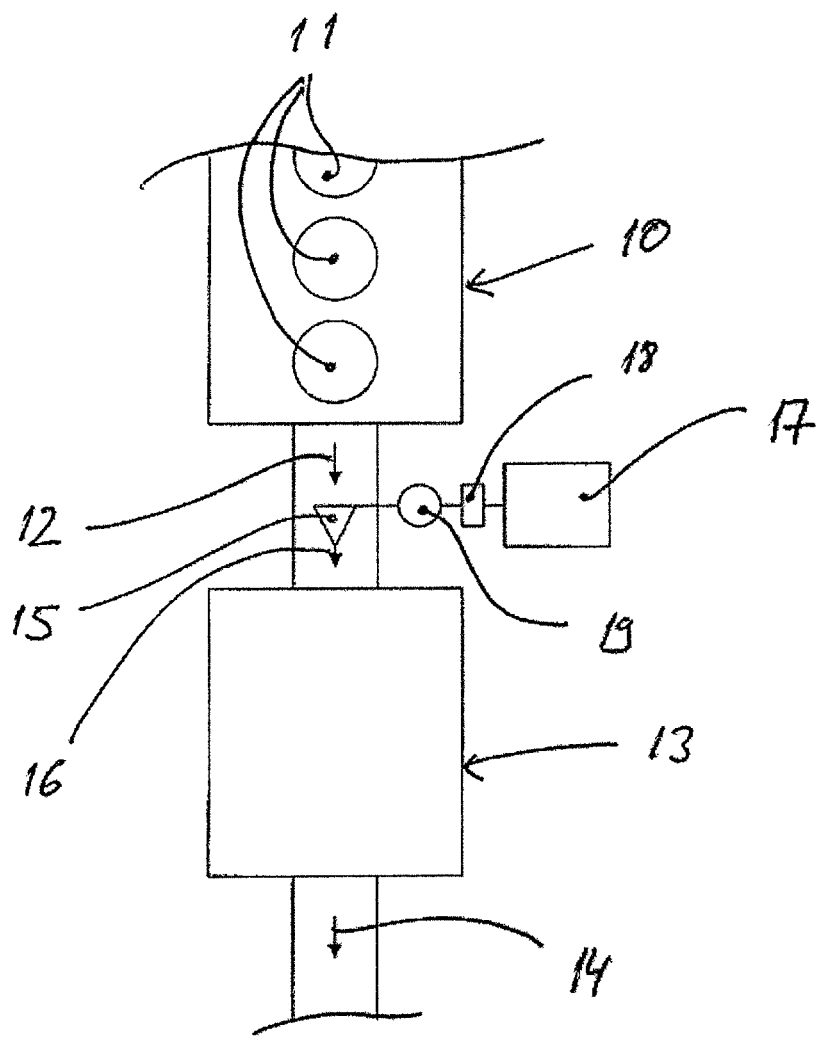

EXHAUST GAS AFTERTREATMENT SYSTEM AND METHOD FOR EXHAUST GAS AFTERTREATMENT

BACKGROUND OF THE INVENTION

1. Field of the Invention

The invention is directed to an exhaust gas aftertreatment system for an internal combustion engine, particularly for a ship's diesel engine operated with heavy oil and to a method for exhaust gas aftertreatment of exhaust gas exiting an internal combustion engine, particularly a ship's diesel engine operated with heavy oil.

2. Description of the Related Art

It is a characteristic of internal combustion engines operated with heavy oil that the fuel that is used, i.e., the heavy oil, has a high sulfur content. Sulfur oxides can react with other constituents of the exhaust gas and lead to deposits which impair the efficiency of the exhaust gas cleaning. This is disadvantageous. There is a need for an exhaust gas aftertreatment system for an internal combustion engine which also allows an efficient cleaning of exhaust gas in internal combustion engines operated with heavy oil.

An internal combustion engine with an exhaust gas turbocharger and an exhaust gas cleaner is known from DE 10 2004 027 593 A1. The exhaust gas turbocharger is constructed either as a one-stage exhaust gas turbocharger or as a two-stage exhaust gas turbocharger. The exhaust gas cleaner comprises a SCR catalyst, which is positioned either downstream of the turbine of the exhaust gas turbocharger or upstream of the turbine of the exhaust gas turbocharger in the one-stage exhaust gas turbocharger. For a two-stage exhaust gas turbocharger with a high-pressure exhaust gas turbocharger and a low-pressure exhaust gas turbocharger, the SCR catalyst is positioned between the high-pressure turbine of the high-pressure exhaust gas turbocharger and the low-pressure turbine of the low-pressure exhaust gas turbocharger.

A SCR catalyst of an exhaust gas aftertreatment system uses ammonia as reductant. In known exhaust gas aftertreatment systems, an aqueous urea solution is injected into the exhaust gas upstream of the SCR catalyst, this aqueous urea solution being decomposed and evaporated in the exhaust gas flow to form water vapor, carbon dioxide and ammonia. For this purpose, a relatively long process line with an evaporator and a hydrolysis catalyst is required between a nozzle, which injects the aqueous urea solution into the exhaust gas and which is positioned in an exhaust gas line running between the internal combustion engine and the SCR catalyst, and the SCR catalyst which uses ammonia as a reductant. This results in a relatively long construction of the exhaust gas aftertreatment system. An exhaust gas aftertreatment system of this type is known from EP 0 487 886 B1.

Further, it is known from EP 0 487 866 B1 to position the process line with the evaporator and hydrolysis catalyst in a separate line rather than in the exhaust gas line between the internal combustion engine and SCR catalyst. However, this embodiment also requires a relatively long process line with an evaporator and a hydrolysis catalyst, which again results in a relatively long construction of the exhaust gas aftertreatment system. Moreover, in such a configuration, a gas mixer is required in the exhaust gas line.

SUMMARY OF THE INVENTION

Against this background, it is the object of the invention to provide a novel exhaust gas aftertreatment system for an internal combustion engine and a method for exhaust gas aftertreatment.

In accordance with an aspect of the present invention, this object is met through an exhaust gas aftertreatment system for an internal combustion engine in which a nozzle is positioned upstream of the SCR catalyst viewed in flow direction of the exhaust gas, by means of which nozzle an aqueous urea solution can be decomposed at a defined pressure and a defined temperature to form water vapor, carbon dioxide and ammonia such that ammonia evaporated by the nozzle can be injected into the exhaust gas via the nozzle.

In accordance with another aspect of the present invention, a method for exhaust gas aftertreatment is defined in which an aqueous urea solution is decomposed so as to form water vapor, carbon dioxide and ammonia via a nozzle, which is positioned upstream of the SCR catalyst viewed in flow direction of the exhaust gas, and ammonia evaporated by the nozzle can be injected into the exhaust gas via the nozzle.

The invention makes it possible to dispense with a process line having an evaporator and a hydrolysis catalyst so that a compact construction can be realized for an exhaust gas aftertreatment system with a SCR catalyst. The decomposition of the aqueous urea solution to form water vapor, carbon dioxide and ammonia vapor is carried out directly by means of the nozzle. Neither an evaporator nor a hydrolysis catalyst nor a gas mixer is required.

The decomposition of the aqueous urea solution to form water vapor, carbon dioxide and ammonia vapor by the nozzle preferably takes place at a pressure between 10 bar and 200 bar and at a temperature between 200° C. and 400° C., particularly at a pressure between 10 bar and 100 bar and a temperature between 200° C. and 300° C. The decomposition of the aqueous urea solution to form water vapor, carbon dioxide and ammonia vapor is particularly efficient under the above-mentioned process conditions in the nozzle.

The nozzle is preferably a flash evaporation nozzle that is positioned directly upstream of the SCR catalyst viewed in flow direction of the exhaust gas. This enables a particularly efficient decomposition of the aqueous urea solution to form water vapor, carbon dioxide and ammonia vapor while ensuring a particularly compact construction of the exhaust gas aftertreatment system.

Preferred further developments of the invention are indicated in the following description.

Exemplary embodiments of the invention are described more fully with reference to the drawing without limiting to these embodiment examples.

Other objects and features of the present invention will become apparent from the following detailed description considered in conjunction with the accompanying drawing. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 1 is a schematic illustration of an exhaust gas aftertreatment system for an internal combustion engine according to an embodiment of the present invention.

DETAILED DESCRIPTION OF THE PRESENTLY PREFERRED EMBODIMENTS

The exemplary embodiments of the present invention are directed to an exhaust gas aftertreatment system for an internal combustion engine, particularly for an internal combustion engine operated with heavy oil. The invention is further directed to a method for exhaust gas aftertreatment in an internal combustion engine of this type.

FIG. 1 shows an internal combustion engine 10 having a plurality of cylinders 11. Exhaust gas 12 exiting the internal combustion engine 10 is guided via an exhaust gas aftertreatment system, which is situated downstream of the internal combustion engine 10 and which comprises at least one SCR catalyst 13. Accordingly, the exhaust gas 12 exiting the internal combustion engine 10 is fed to the SCR catalyst 13 as unpurified exhaust gas 12 and leaves the SCR catalyst 13 as at least partially cleaned exhaust gas 14. A reductant for cleaning the exhaust gas is needed in the SCR catalyst 13. Ammonia is preferably used as the reductant.

A nozzle 15 is provided upstream of the SCR catalyst 13, viewed in flow direction of the exhaust gas. An aqueous urea solution is decomposed in this nozzle 15 to form water vapor, carbon dioxide and ammonia such that ammonia vapor 16 evaporated via the nozzle 15 is injected into the exhaust gas along with the water vapor and carbon dioxide.

Consequently, according to the present invention, rather than injecting an aqueous urea solution into the exhaust gas flow 12 that must then be decomposed and evaporated in the exhaust gas flow 12, decomposition products or evaporation products of the aqueous urea solution, i.e., the water vapor, carbon dioxide and ammonia vapor, are formed directly via the nozzle 15 and injected into the exhaust gas flow 12, leaving the internal combustion engine 10 so that a separate process line with an evaporator and a hydrolysis catalyst can be dispensed with.

The urea solution that is to be decomposed and evaporated by the nozzle 15 is held in a reservoir 17. The aqueous urea solution is heated to a defined process temperature by a heating device 18, and a feed pump 19 supplies the aqueous urea solution to the nozzle 15 at a defined pressure.

The aqueous urea solution is decomposed in the nozzle 15, preferably at a pressure between 10 bar and 200 bar and at a temperature between 200° C. and 400° C., to form water vapor, carbon dioxide and ammonia vapor.

The decomposition of the aqueous urea solution by the nozzle 15 to form water vapor, carbon dioxide and ammonia vapor preferably takes place at a pressure between 10 bar and 100 bar and at a temperature between 200° C. and 300° C.

One advantage of the disclosed embodiment is that a long process line with an evaporator and a hydrolysis catalyst can be dispensed with so that a compact construction of the exhaust gas aftertreatment system is possible. A further advantage is that there is no risk that crystals will form in the exhaust gas flow during the decomposition of the aqueous urea solution and be deposited in the SCR catalyst 13 so as to impair its efficiency. A gas mixer can also be dispensed with.

Any nozzle that can withstand the temperature ranges and pressure ranges mentioned above can be used as nozzle 15. For example, a conventional fuel injection nozzle of a common rail fuel injection system can be used as nozzle 15.

The nozzle 15 is preferably a flash evaporation nozzle so that the aqueous urea solution that can be supplied to the nozzle 15 at the defined pressure and defined temperature is decomposed by the nozzle 15 to form water vapor, carbon dioxide and ammonia vapor by means of a flash evaporation and is injected into the exhaust gas.

In a particularly preferred manner, a flash evaporation nozzle having a nozzle swirl chamber by which a centrifugal acceleration can be applied to the aqueous urea solution or decomposition constituents of water vapor, carbon dioxide and ammonia vapor during decomposition is used. This ensures an efficient distribution of the ammonia vapor in the exhaust gas.

The nozzle 15 is preferably positioned directly upstream of the SCR catalyst 13 viewed in flow direction of the exhaust gas so as to allow an even more compact construction of the exhaust gas aftertreatment system. This is possible and advantageous particularly when the nozzle 15 is constructed as a flash evaporation nozzle with a nozzle swirl chamber.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An exhaust gas aftertreatment system for an internal combustion engine, the system comprising:
   a SCR catalyst (13) that uses ammonia as a reductant; and
   a nozzle (15), positioned upstream of the SCR catalyst (13) viewed in flow direction of the exhaust gas,
   wherein the nozzle (15) is configured to decompose an aqueous urea solution at a defined pressure and at a defined temperature to form water vapor, carbon dioxide and ammonia vapor, the nozzle (15) being configured to inject the ammonia vapor into the exhaust gas, and
   wherein the nozzle (15) is a flash evaporation nozzle having a nozzle swirl chamber.

2. The exhaust gas aftertreatment system according to claim 1, wherein the nozzle (15) decomposes the aqueous urea solution to form the water vapor, carbon dioxide and ammonia vapor at a pressure between 5 bar and 200 bar and at a temperature between 100° C. and 400° C.

3. The exhaust gas aftertreatment system according to claim 2, wherein the nozzle (15) decomposes the aqueous urea solution to form the water vapor, carbon dioxide and ammonia vapor at a pressure between 10 bar and 100 bar and at a temperature between 200° C. and 300° C.

4. The exhaust gas aftertreatment system according to claim 1, wherein the aqueous urea solution is supplied to the nozzle (15) at a defined pressure and defined temperature, and wherein the nozzle (15) is configured to decompose the aqueous urea solution to form the water vapor, carbon dioxide and ammonia vapor by flash evaporation for injection into the exhaust gas by the nozzle (15).

5. The exhaust gas aftertreatment system according to claim 1, wherein the nozzle (15) is positioned directly upstream of the SCR catalyst (13) viewed in flow direction of the exhaust gas.

6. The exhaust gas aftertreatment system according to claim 1, wherein the internal combustion engine is a ship's diesel engine operated with heavy oil.

7. A method for exhaust gas aftertreatment of exhaust gas exiting an internal combustion engine, in a system in which the exhaust gas is guided via a SCR catalyst that uses ammonia as reductant, the method comprising:

decomposing, by a flash evaporation nozzle, having a nozzle swirl chamber, positioned upstream of the SCR catalyst viewed in flow direction of the exhaust gas, an aqueous urea solution to form water vapor, carbon dioxide and ammonia vapor; and injecting, by the nozzle (15), the ammonia evaporated by the nozzle (15) into the exhaust gas.

8. The method according to claim 7, wherein the aqueous urea solution is decomposed in the nozzle (15) at a pressure between 10 bar and 200 bar and at a temperature between 200° C. and 400° C. to form the water vapor, carbon dioxide and ammonia vapor.

9. The method according to claim 8, wherein the aqueous urea solution is decomposed in the nozzle (15) at a pressure between 10 bar and 100 bar and at a temperature between 200° C. and 300° C. to form the water vapor, carbon dioxide and ammonia vapor.

10. The method according to claim 7, wherein the internal combustion engine is a ship's diesel engine operated with heavy oil.

\* \* \* \* \*